United States Patent
Semmelmann et al.

(10) Patent No.: US 10,295,334 B2
(45) Date of Patent: May 21, 2019

(54) 3D MEASURING SYSTEM

(71) Applicant: CARL ZEISS OPTOTECHNIK GMBH, Neubeuern (DE)

(72) Inventors: Ernst Semmelmann, Rosenheim (DE); Thomas Roth, Hanau (DE)

(73) Assignee: CARL ZEISS OPTOTECHNIK GMBH, Neubeuern (DE)

( * ) Notice: Subject to any disclaimer, the term of this patent is extended or adjusted under 35 U.S.C. 154(b) by 0 days.

(21) Appl. No.: 15/408,817

(22) Filed: Jan. 18, 2017

(65) Prior Publication Data

US 2018/0023949 A1   Jan. 25, 2018

(30) Foreign Application Priority Data

Jul. 21, 2016 (DE) ............... 20 2016 004 550 U

(51) Int. Cl.
   *G01B 11/25*   (2006.01)
   *G01B 5/00*    (2006.01)

(52) U.S. Cl.
   CPC ........ *G01B 11/2513* (2013.01); *G01B 5/0014* (2013.01)

(58) Field of Classification Search
   CPC .... H04N 13/0203; H04N 5/33; H04N 5/2253; G06K 7/10544; G06K 7/10584; G06K 7/10732; G03B 17/48; G03B 17/54; G01B 11/2513; G01B 5/0014
   See application file for complete search history.

(56) References Cited

U.S. PATENT DOCUMENTS

| | | | | |
|---|---|---|---|---|
| 5,680,215 A | * | 10/1997 | Huber | G01B 11/306 356/237.1 |
| 7,375,826 B1 | * | 5/2008 | Lavelle | G01B 11/2518 356/606 |
| 8,233,040 B2 | * | 7/2012 | Patel | G06K 7/10 348/61 |
| 8,605,284 B2 | * | 12/2013 | Toriumi | G01N 21/474 356/445 |
| 8,615,374 B1 | * | 12/2013 | Discenzo | G06F 15/00 219/497 |
| 2009/0001174 A1 | * | 1/2009 | Barkan | G06K 7/10544 235/462.42 |
| 2009/0135258 A1 | * | 5/2009 | Nozaki | G03B 17/48 348/207.99 |
| 2010/0073642 A1 | * | 3/2010 | Sueoka | F21V 29/004 353/54 |
| 2010/0290060 A1 | * | 11/2010 | Mohazzab | G01B 11/25 356/492 |
| 2011/0064402 A1 | * | 3/2011 | Yee | G06F 3/011 396/535 |
| 2013/0010268 A1 | * | 1/2013 | Nishima | G03B 21/16 353/52 |

(Continued)

FOREIGN PATENT DOCUMENTS

| | | |
|---|---|---|
| DE | 10 2011 011 360 A1 | 8/2012 |
| EP | 2 105 701 A1 | 9/2009 |
| EP | 2 489 977 A2 | 8/2012 |

*Primary Examiner* — Sang H Nguyen
(74) *Attorney, Agent, or Firm* — Harness, Dickey & Pierce, P.L.C.

(57) ABSTRACT

A 3D measuring system having a projector, a camera and a chassis that connects the projector and the camera, characterized by a heating device for heating one or more components of the 3D measuring system.

19 Claims, 2 Drawing Sheets

(56) References Cited

U.S. PATENT DOCUMENTS

| | | | |
|---|---|---|---|
| 2014/0111682 A1* | 4/2014 | Flugge | G02B 7/08 |
| | | | 29/407.04 |
| 2015/0062303 A1* | 3/2015 | Hanson | H04N 5/2252 |
| | | | 348/47 |
| 2015/0077517 A1* | 3/2015 | Powers | H04N 5/2253 |
| | | | 348/46 |
| 2016/0004146 A1* | 1/2016 | Nouda | G03B 21/145 |
| | | | 353/61 |
| 2016/0227193 A1* | 8/2016 | Osterwood | G01S 17/42 |
| 2017/0054965 A1* | 2/2017 | Raab | G01C 11/02 |

\* cited by examiner

3D MEASURING SYSTEM

CROSS-REFERENCE TO OTHER APPLICATIONS

The present application claims priority of German patent application DE 20 2016 004 550.5, filed Jul. 21, 2016. The disclosure of the above application is incorporated herein by reference.

BACKGROUND OF THE INVENTION

The invention relates to a 3D measuring system and to a method for heating such a 3D measuring system. The 3D measuring system comprises a projector, a camera and a chassis that connects the projector and the camera. Such 3D measuring systems are used to determine the 3D coordinates of objects.

EP 2 105 701 A1 discloses a 3D measuring system of this type. DE 10 2011 011 360 A1 discloses a further 3D measuring system of this type.

The projector of the 3D measuring system typically comprises a light source, in particular an LED, an optics and a pattern generator for generating a pattern that is to be projected onto the object, in particular a stripe pattern or a stochastic pattern. The camera typically comprises an optics and an image sensor having pixels that are arranged regularly in the manner of a surface, in particular a CCD sensor or a CMOS sensor. The camera is aligned with the region of the object onto which the pattern generator projects the pattern. It is possible for the 3D measuring system to have a plurality of projectors and/or cameras. The 3D measuring system can furthermore have further components, in particular a reference camera for recording one or more reference marks and/or sensors for a tracking apparatus.

Upon start-up of a 3D measuring system it warms up. As soon as the chassis has warmed up, the material of which the 3D measuring system is composed expands. It is also possible that parts of the chassis warp. As a result, the distance between the projector and the camera and the angle between the projector and the camera may change. If the 3D measuring system is conventionally heated in this manner, it is necessary to wait until a thermally stable state has been achieved. Once the system is thermally stable, the distance between the projector and the camera and the angle between the projector and the camera no longer change. Only at this point is it possible for the 3D measuring system to be calibrated in order to supply accurate 3D measurement data. If the decision is made to wait until all components of the 3D measuring system are thoroughly warmed up, this can take several hours, depending on the heat capacity of the system and of its components.

A significant proportion of the temperature increase in the 3D measuring system stems from the light source that is present in the projector and generates not only light, but also heat that must be transferred away. This can be done using a ventilation system. However, some of the heat also enters the chassis and the remaining mechanical parts of the 3D measuring system. Moreover, a large portion of the generated light is absorbed in the projector or lens of the projector, which contributes to the further heating of the 3D measuring system. In addition, further components of the 3D measuring system also generate heat, in particular the camera and circuit boards. This heat cannot be transferred away completely by the ventilation system.

In order to address the problem of thermal expansion, it is possible to use materials exhibiting very low thermal expansion, such as CRP, for constructing the 3D measuring system. In that case, the temperature of the chassis has less of an effect on the measurement result, since the chassis expands less and warps less. However, this solution goes hand-in-hand with the disadvantage of high costs, since components made of CRP and similar materials very often need to be produced manually. Due to the manual production, the process reliability also suffers. Furthermore, mechanical or thermal properties can deviate within a batch. Ultimately, it is not possible to replace all metal components by CRP or similar materials.

Another option is to separate components of the 3D measuring system in which high temperatures occur from the chassis using thermally insulating materials. An attempt could be made in this way in particular to thermally separate the projector including its light source from the chassis. However, the thermally insulating layers have only a relatively low mechanical strength. Consequently, they have a disadvantageous effect on the stability of the 3D measuring system.

SUMMARY OF THE INVENTION

Starting from this, the invention is based on the object of proposing a 3D measuring system and a method for heating a 3D measuring system which result in the 3D measuring system becoming operational more quickly.

This object is achieved according to the teachings of the invention. The 3D measuring system comprises a heating device for heating one or more components of the 3D measuring system. Hereby, the user can start the calibration and measurements very soon after start-up of the 3D measuring system.

Advantageous refinements are specified in the dependent claims.

A fan is preferably attached to the chassis. Heat can be transferred away using the fan.

It is advantageous if the heating device comprises one or more heating pads. The one or more heating pads are preferably attached to the chassis, preferably to a bar of the chassis. The heating pads are preferably adhesively bonded to the chassis or the bar.

It is advantageous if a first heating pad is attached to the front side of the chassis or of the bar. Instead, or additionally, a second heating pad can be attached to the rear of the chassis or of the bar. The front side is here the side toward which the optics of the projector and the camera face. The rear is the side away from which the optics of the projector and the camera face.

According to a further advantageous refinement, the heat output of the heating device and/or of the one or more heating pads is variable. It is possible in this way to adapt the heat output to the requirements.

A further advantageous refinement is characterized in that one or more temperature sensors are present. With preference, one temperature sensor is arranged in the housing of the projector and/or one temperature sensor is arranged in the chassis, in particular in the bar of the chassis, and/or one temperature sensor is arranged in the airflow of a fan. It is advantageous if a temperature sensor is arranged in the area surrounding the 3D measuring system. In this way, the temperature of the air surrounding the 3D measuring system can be measured.

According to a further advantageous refinement, a closed-loop control device for controlling the output of the heating device and/or of the one or more heating pads is present. The closed-loop control device operates as a function of the temperature of one or more or all temperature sensors. It is particularly advantageous if the ambient temperature is evaluated which is measured by the temperature sensor in the area surrounding the 3D measuring system.

In a method for heating a 3D measuring system, the object on which the invention is based is achieved by way of the features of claim 8. According to the invention, the 3D measuring system is heated during or preferably soon after the start-up of the 3D measuring system.

It is advantageous if the heat output of the heating device is varied. The heat output of the heating device can be controlled in open-loop or closed-loop fashion.

According to a further advantageous refinement, the heat output of the heating device is varied as a function of the temperature of one or more or all temperature sensors.

BRIEF DESCRIPTION OF THE DRAWINGS

An exemplary embodiment of the invention will be explained in detail below with reference to the attached drawings. In the drawings.

DETAILED DESCRIPTION OF PREFERRED EMBODIMENT

Figure 1:
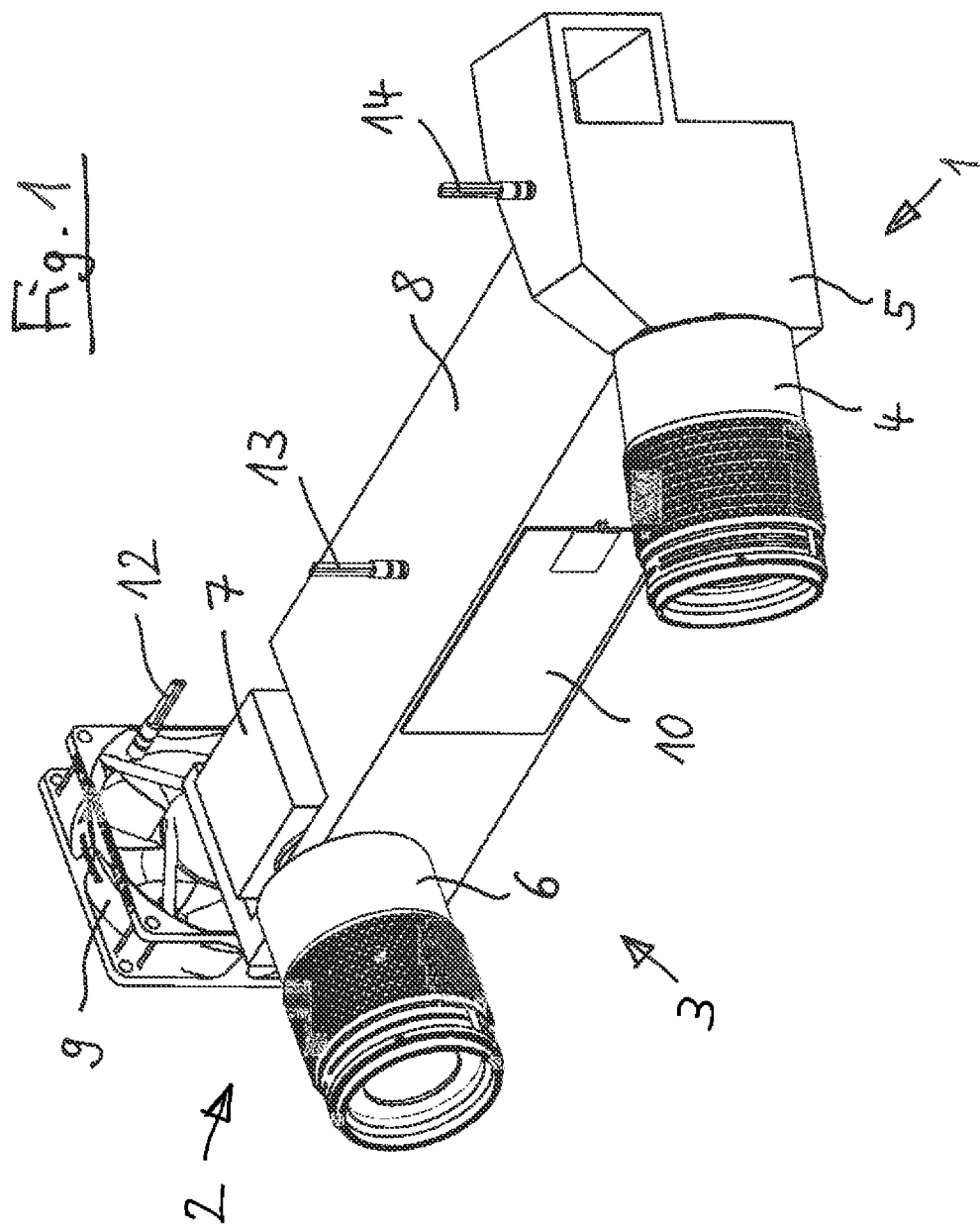
FIG. 1 shows a 3D measuring system in a perspective front view.
Figure 2:
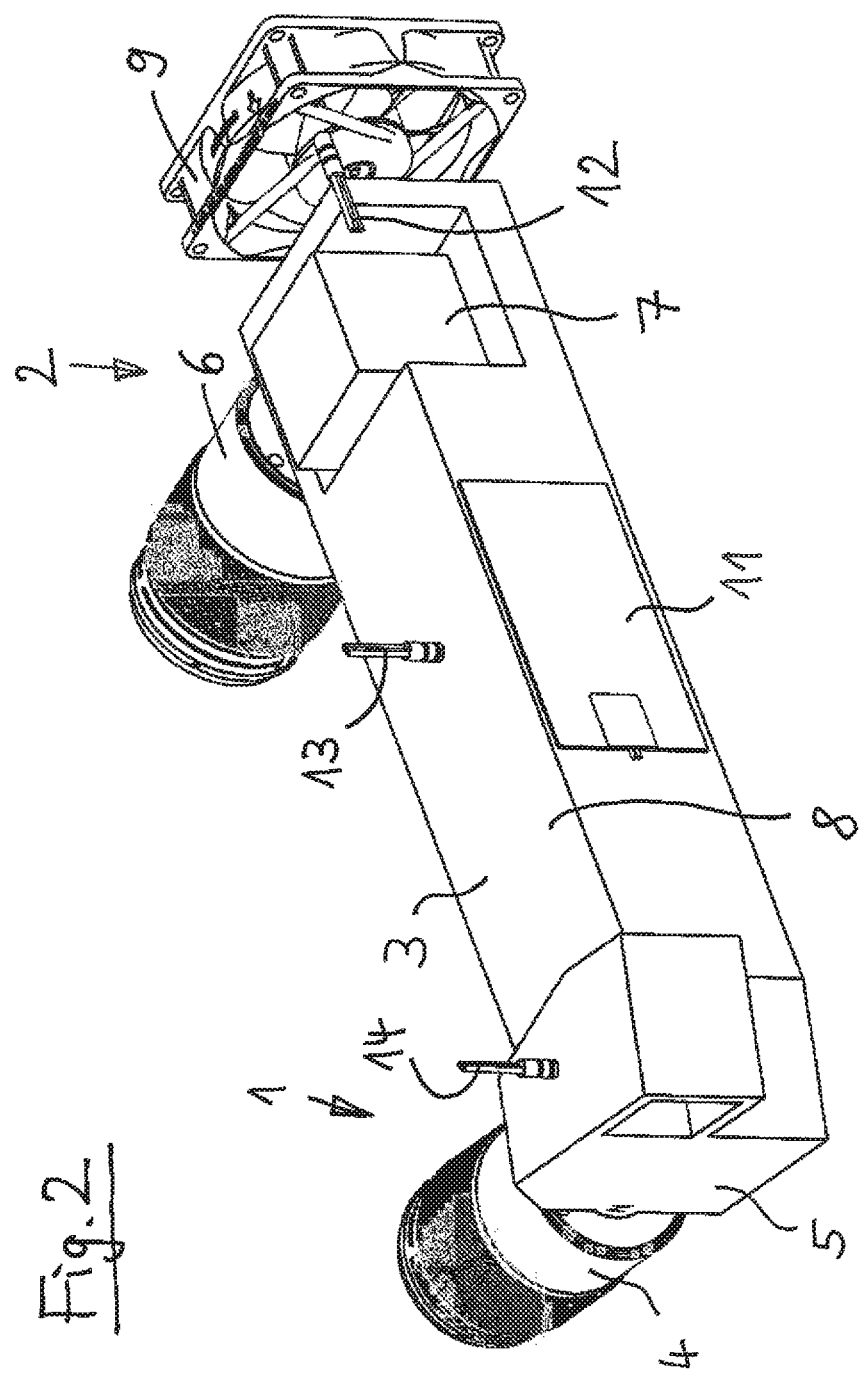
FIG. 2 shows the 3D measuring system according to FIG. 1 in a perspective rear view.

The 3D measuring system comprises a projector 1, a camera 2 and a chassis 3 that connects the projector 1 and the camera 2. The projector 1 projects a stripe pattern onto the object to be measured (not illustrated in the drawing), which is recorded by the camera 2 and is evaluated in an evaluation device (not illustrated in the drawing). The evaluation device can be located in the 3D measuring system. However, it is also possible for the data to be transmitted from the 3D measuring system to the evaluation device, which may be effected wirelessly or by cable.

The projector 1 comprises an optics 4 and a projector housing 5. The camera 2 comprises an optics 6 and a camera housing 7. The projector housing 5 and the camera housing 7 are connected by way of a bar 8 of the chassis 3. The bar 8 has a rectangular or square cross section. The optics 4, 6 of the projector 1 and of the camera 2 are adjusted with respect to their distance and their angular position.

A fan 9 is arranged at the chassis 3. The fan 9 is embodied as an intake fan. It is situated at the front end of the bar 8 in the region of the camera 2. The fan 8 takes in air from the environment and blows said air towards the bar 8. The bar 8 is hollow. The air transported by the fan 9 flows through the bar 8 from the side with the camera 2 to the projector 1. It leaves the bar 8 on the side with the projector 1. A heat sink may be located there.

A heating device for heating the 3D measuring system is arranged on the chassis 3. As used herein and in the claims, the terms "heating device" or "heat generating device" means an electrical device, such as an electrical heating pad, whose primary function is to generate heat. The heating device comprises a first heating pad 10 and a second heating pad 11. The first heating pad 10 is attached to the front side of the bar 8 of the chassis 3, specifically adhesively bonded thereto. The second heating pad 11 is attached to the rear of the bar 8 of the chassis 3, specifically adhesively bonded thereto. The front side of the bar 8 is the side that faces the optics 4, 6. The rear of the bar 8 is the side that faces away from the optics 4, 6.

Three temperature sensors 12, 13, 14 are attached to the 3D measuring system. The temperature sensor 12 is attached in the airflow of the fan 9. It is fixed to the housing of the fan 9. The temperature sensor 13 is attached in the bar 8 of the chassis 3. The temperature sensor 14 is attached in the projector housing 5. The temperature sensor 13 and/or temperature sensor 14 can be encapsulated in the bar 8 or in the projector housing 5. A further temperature sensor is arranged in the area surrounding the 3D measuring system (not illustrated in the drawing). It serves for measuring the temperature of the air that surrounds the 3D measuring system.

The heating pads 10, 11 are electrically heatable. The 3D measuring system furthermore comprises a closed-loop control device for controlling the output of the heating pads 10, 11 as a function of the temperature of the temperature sensors 12, 13, 14 and of the temperature sensor for the environment. The closed-loop control device can be arranged in the bar 8. It is advantageous if the closed-loop control is performed in dependence on the temperature sensor for the environment and one of the temperature sensors 12, 13, 14. The closed-loop control can, however, also be performed in dependence on the temperature sensor for the environment and two temperature sensors 12, 13, 14, or all three temperature sensors 12, 13, 14.

During operation, the heating pads 10, 11 are driven, for example using a printed circuit board. In the fully warmed-up operating state, the side of the bar 8 which faces the camera 2 has a significantly lower temperature than the side facing the projector 1, because a significant heat source is situated in the projector 1, specifically the light source of the projector 1, which may be in particular an LED. This temperature distribution cannot be achieved by the heating pads 10, 11, which are located substantially in the center between the projector 1 and the camera 2. In order to still quickly and completely heat the 3D measuring system, if possible the same amount of energy in the form of heat is introduced into the bar within a short period of time as the 3D measuring system has absorbed up to the warm state. Subsequently it is possible to wait until the heat in the 3D measuring system has been distributed in a similar or identical fashion as in the fully warmed-up, thermally stable state. The output of the heating pads 10, 11 can be varied as a closed-loop control variable.

By way of the temperature sensors 12, 13, 14 and the temperature sensor for the environment, it is possible to ascertain the difference between the temperature of the chassis 3 and of the environment. The output of the heating pads 10, 11 can be controlled in closed-loop fashion as a function of this temperature difference. Since it is not possible using the heating pads 10, 11 to heat the chassis 3 exactly as in the fully warmed-up, thermally stable state, tests can be carried out in order to ascertain the optimum stop temperature for the heating phase.

This optimum stop temperature can be ascertained from the differences between the temperatures of the temperature sensors 13 and/or 14, which are connected to the bar 8 and the projector housing 5, and the temperature of the temperature sensor for the environment. What is observed in the course of these tests is how long it takes until the 3D measuring system supplies constant measurement results at a constant ambient temperature. This is the case if the distance between the projector 1 and the camera 2 and the angle between the projector 1 and the camera 2 no longer change, in other words the chassis 3 is thermally stable. In this way, the output of the heating pads 10, 11 and the stop temperature at the temperature sensors can be optimized empirically toward the shortest possible warm-up phase of the 3D measuring system.

If the 3D measuring system is switched off only for a short period of time, such that it does not completely cool down, and is subsequently started up again, the temperature differences between the chassis 3 and the environment and possibly the projector housing 5 can be checked. If these values are less than a specified limit value, the heating pads 10, 11 can be re-activated to heat the 3D measuring system and also to reduce in this case the heating time for the user. It is possible here to display a countdown using software to the user during the warm-up phase. The gradient of the temperature curve of the sensor 13 and/or of the sensor 14 can be used as the basis for the time calculation.

It is advantageous to evaluate both the temperature in the chassis 3 and the temperature of the environment. It is furthermore advantageous to use information relating to the thermally stable state of the 3D measuring system and the behavior of the 3D measuring system during the warm-up process. Using these temperature values, it is possible for the software to control the heat output and the duration of the heating stages of the heating pads 10, 11 in closed-loop fashion. It is also possible to use heat sources other than the heating pads 10, 11.

What is claimed:

1. A 3D measuring system having a projector, a camera and a chassis that connects the projector and the camera, with the projector and the camera being attached to the chassis at first and second spaced apart locations, respectively, characterized by:
    a heat generating device for heating the chassis of the 3D measuring system in an area between the first and second spaced apart locations;
    wherein the heat generating device comprises one or more electrically heatable heating pads, which are attached to the chassis in the area between the first and second spaced apart locations.

2. The 3D measuring system according to claim 1, characterized in that a fan is attached to the chassis.

3. The 3D measuring system according to claim 2, characterized in that one or more temperature sensors are present in the airflow of the fan.

4. The 3D measuring system according to claim 1, characterized in that a first heating pad is attached to a front side of the chassis, and a second heating pad is attached to a rear side of the chassis.

5. The 3D measuring system according to claim 4, characterized in that the heat output of both the first and second heating pads is variable.

6. The 3D measuring system according to claim 5, characterized in that one or more temperature sensors are connected to the chassis at a location between the first and second spaced apart locations.

7. The 3D measuring system according to claim 6, characterized by a closed-loop control device for controlling the output of the first and second heating pads in dependence on the temperature of one or more of the temperature sensors.

8. The 3D measuring system according to claim 1, characterized in that a first heating pad is attached to a front side of a bar of the chassis, and a second heating pad is attached to a rear side of the bar.

9. The 3D measuring system according to claim 8, characterized in that the heat output of both the first and second heating pads is variable.

10. The 3D measuring system according to claim 1, characterized in that the heat output of the heat generating device is variable.

11. The 3D measuring system according to claim 10, characterized in that one or more temperature sensors are present in one or more of the components of the 3D measuring system.

12. The 3D measuring system according to claim 11, characterized by a closed-loop control device for controlling the output of the heat generating device in dependence on the temperature of one or more of the temperature sensors.

13. The 3D measuring system according to claim 11, characterized by a controller for controlling the heat generating device such that the chassis is heated during or soon after the start-up of the 3D measuring system.

14. The 3D measuring system according to claim 10, characterized in that one or more temperature sensors are present in the vicinity of the 3D measuring system.

15. A method for heating a 3D measuring system according to claim 1, characterized in that the chassis is heated during or soon after the start-up of the 3D measuring system.

16. The method according to claim 15, characterized in that the heat output of the heat generating device is varied.

17. The method according to claim 16, characterized in that the heat output of the heat generating device is varied as a function of the temperature of one or more of the temperature sensors.

18. A 3D measuring system having a projector, a camera and a chassis that connects the projector and the camera, with the projector and the camera being attached to the chassis at first and second spaced apart locations, respectively, characterized by:
    a heat generating device for heating the chassis of the 3D measuring system in an area between the first and second spaced apart locations;
    wherein the heat output of the heat generating device is variable; and
    further comprising one or more temperature sensors in one or more of the components of the 3D measuring system and a closed-loop control device for controlling the output of the heat generating device in dependence on the temperature of one or more of the temperature sensors;
    wherein the closed-loop control device controls the output of the heat generating device in dependence on a temperature of the chassis or a difference between a temperature of the chassis and a temperature of an environment, and stops or reduces the heating output of the heat generating device after the temperature of the chassis or the difference between the temperature of the chassis and the temperature of the environment reaches a predetermined temperature threshold.

19. A method for heating a 3D measuring system comprising a projector, a camera and a chassis that connects the projector and the camera, with the projector and the camera being attached to the chassis at first and second spaced apart locations, respectively, a heat generating device for heating the chassis of the 3D measuring system in an area between the first and second spaced apart locations, and a closed-loop control device for controlling the output of the heat generating device; the method comprising the steps of:
    heating the chassis during or soon after the start-up of the 3D measuring system; and
    controlling the output of the heat generating device in dependence on a temperature of the chassis or a difference between a temperature of the chassis and a temperature of an environment, and stopping or reducing the heating output of the heat generating device after the temperature of the chassis or the difference between the temperature of the chassis and the temperature of the environment reaches a predetermined temperature threshold.

\* \* \* \* \*